April 25, 1939.   W. T. HAGER   2,155,937
METHOD FOR THE INCUBATION OF EGGS AND HATCHING
CHICKENS, AS WELL AS PHEASANTS AND THE LIKE
Original Filed July 22, 1931   6 Sheets-Sheet 1

INVENTOR.
Wilson T. Hager,
BY
R. J. Boswell
ATTORNEY.

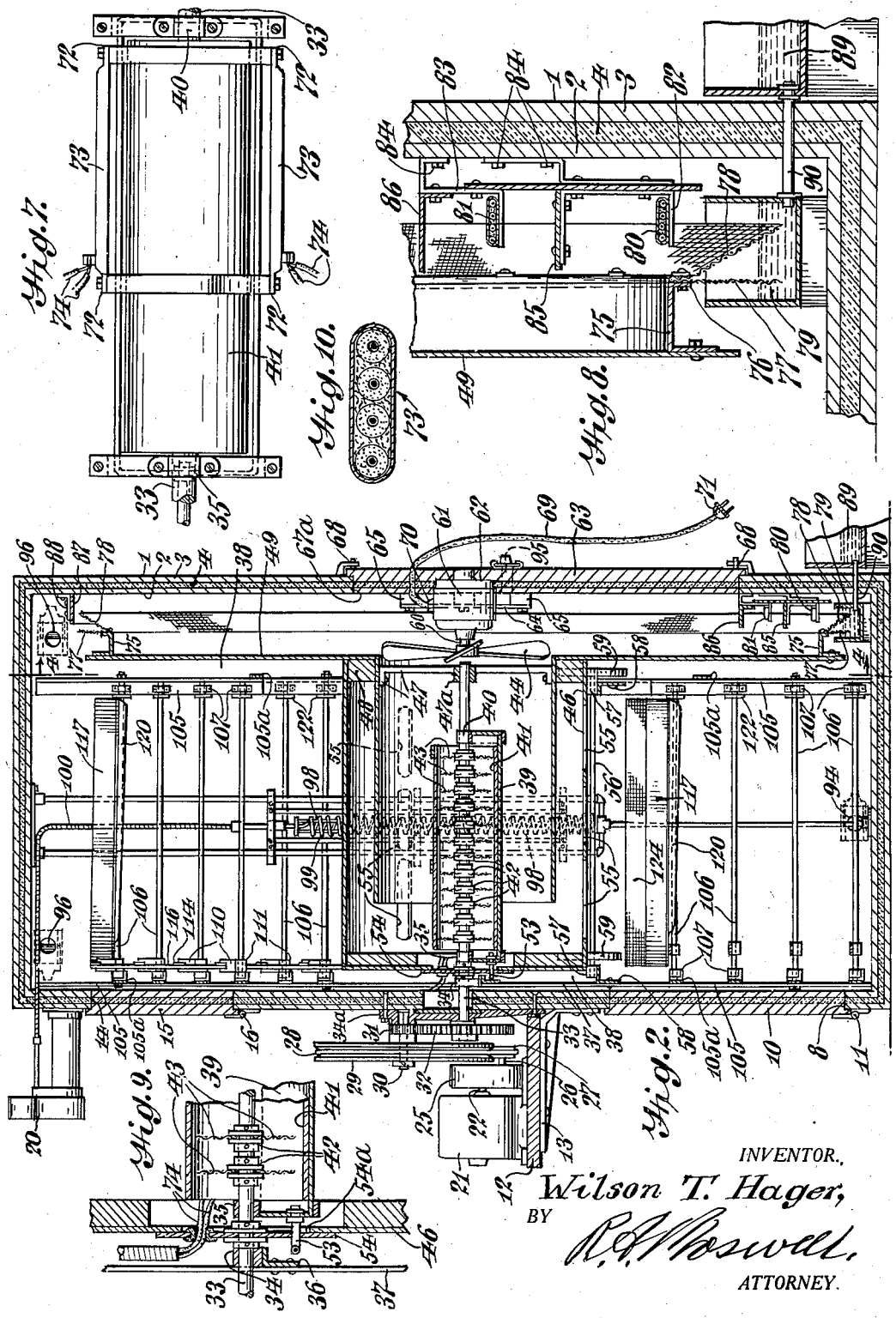

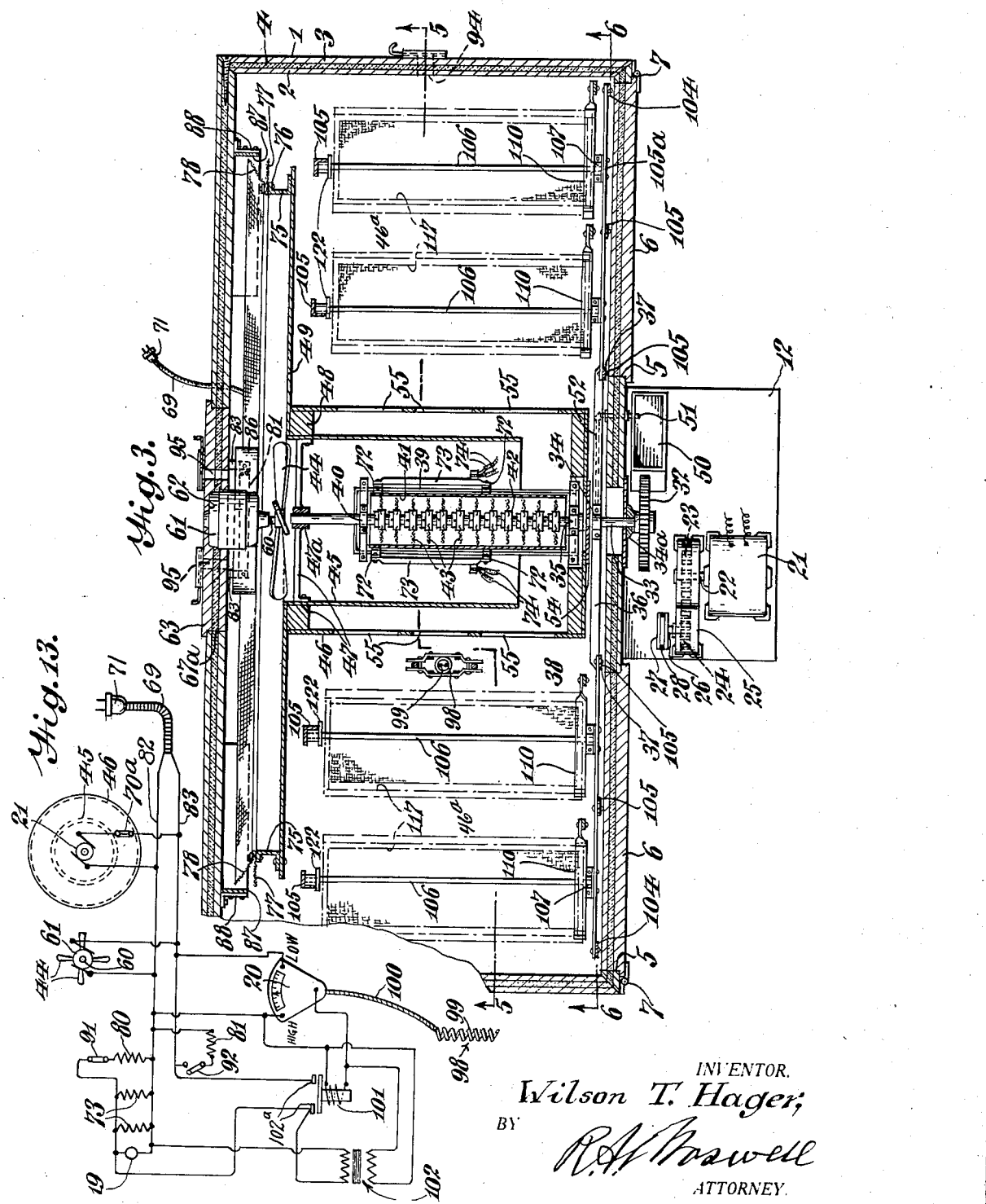

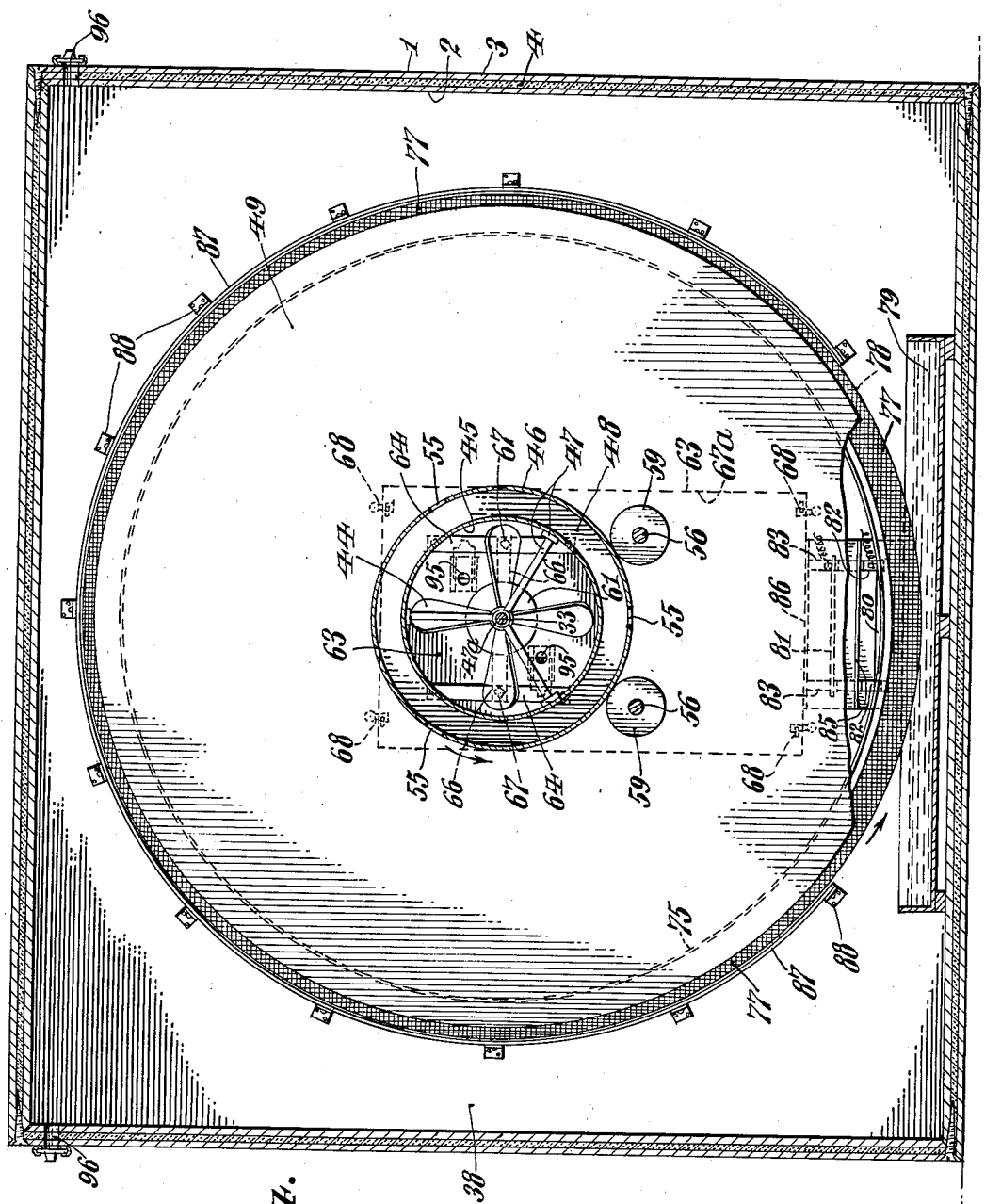

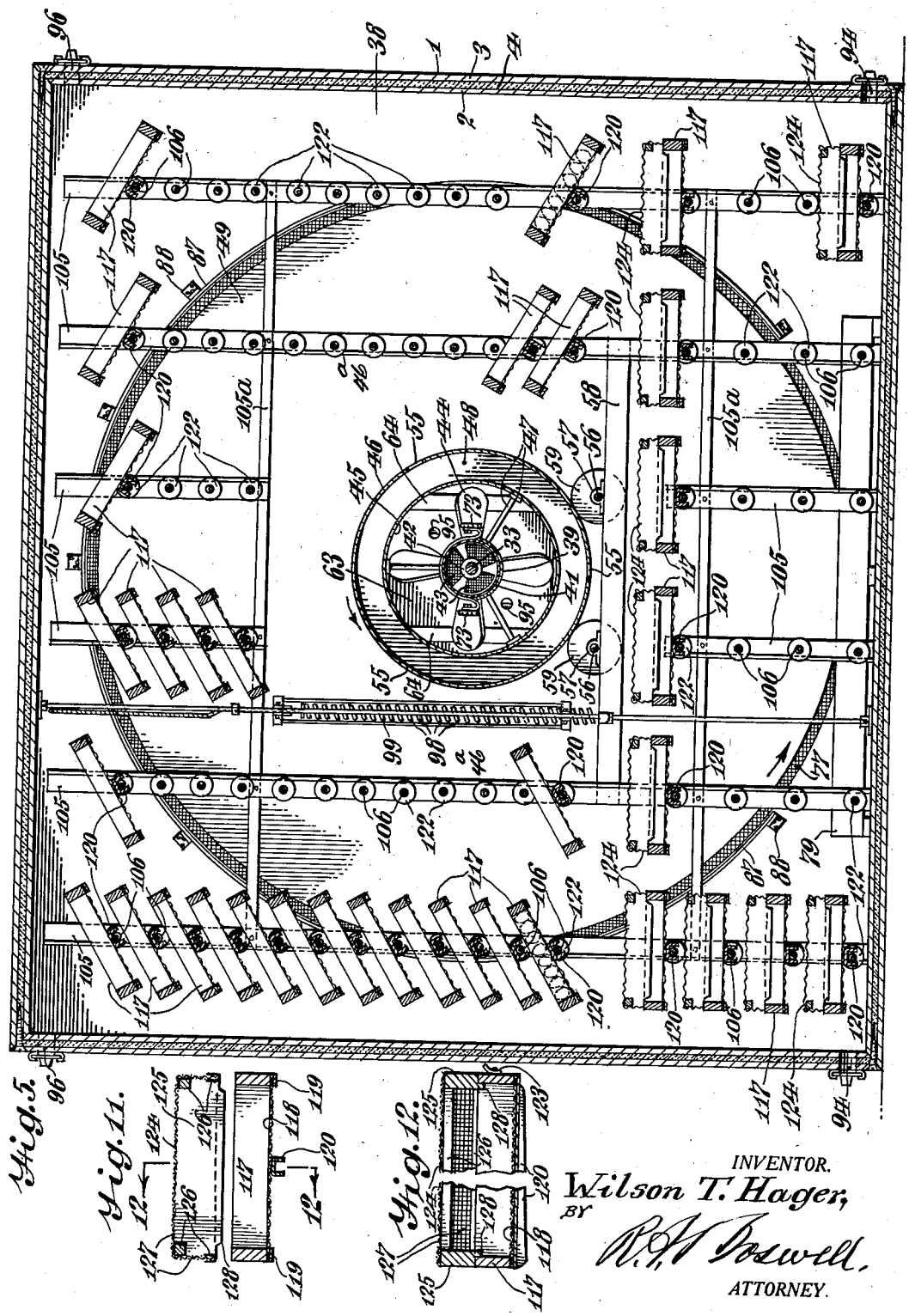

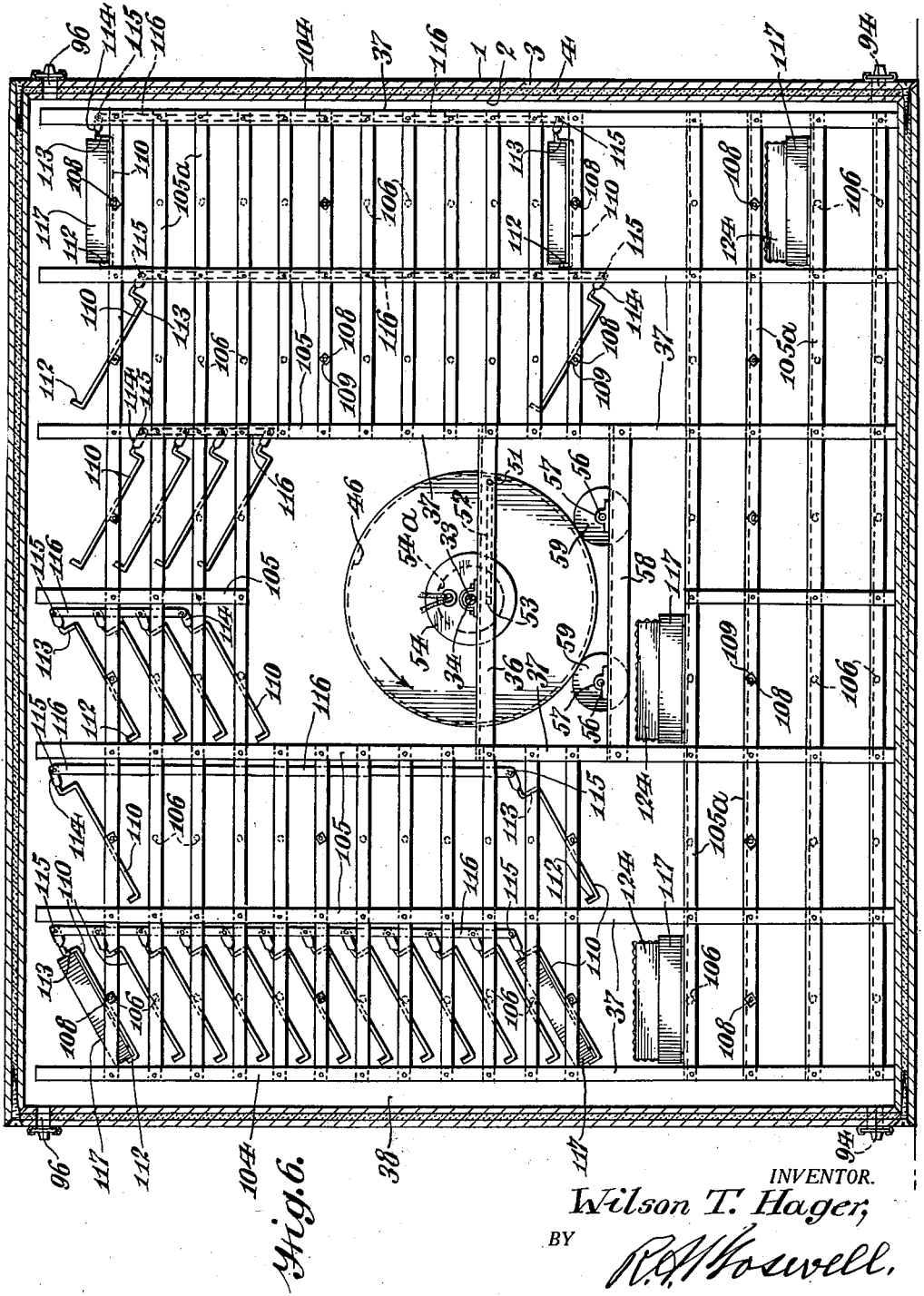

Patented Apr. 25, 1939

2,155,937

UNITED STATES PATENT OFFICE 2,155,937

METHOD FOR THE INCUBATION OF EGGS AND HATCHING CHICKENS, AS WELL AS PHEASANTS AND THE LIKE

Wilson T. Hager, Erwinna, Pa., assignor to Willet V. Hager, Erwinna, Pa.

Original application July 22, 1931, Serial No. 552,486. Divided and this application January 7, 1936, Serial No. 57,866

2 Claims. (Cl. 119—37)

This invention relates to an improved method for the incubation of eggs and hatching of chickens and similar fowl such as pheasants, and essentially the invention has for its purpose the idea of introducing fresh air through the center of a hatching chamber, generating heat at such central portion and mixing said heat with the air creating a constant uniform temperature laden with constant uniform moisture, giving said air an undulated course, circulating said air in a centrifugal direction with uniformity to every portion of the interior of an incubator cabinet, also introducing additional moisture, constantly agitating same, the distribution being centrifugally from polygonal points of a rotating drum on the interior of the chamber of the cabinet, and hence causing full and healthy growth to the chicks when hatched. The apparatus disclosed herein is claimed in my Patent No. 2,026,530, issued January 7, 1936 on an application filed July 22, 1931, Serial No. 552,486, of which this application is a division.

In the drawings:—

Figure 2 is a vertical sectional view on line 2—2 of Figure 1.

Figure 3 is a horizontal longitudinal sectional view on line 3—3 of Figure 1.

Figure 4 is a sectional view on line 4—4 of Figure 2.

Figure 5 is a sectional view on line 5—5 of Figure 3.

Figure 6 is a sectional view on line 6—6 of Figure 3.

Figure 7 is an enlarged plan view of the innermost cylinder of the air circulating means.

Figure 8 is an enlarged detailed sectional view of the lower right hand corner of Figure 2.

Figure 9 is an enlarged sectional view of the inner portion of the left hand side of Figure 2.

Figure 10 is a detail view of a portion of one of the heating elements shown in Figure 8.

Figure 11 is a transverse sectional view of an egg tray.

Figure 12 is a view taken on the line 12—12 of Fig. 11.

Figure 13 is a view of the diagram of the electric wiring for the heating elements, the thermostat relay, signal light and indicator and motors.

Figure 1:
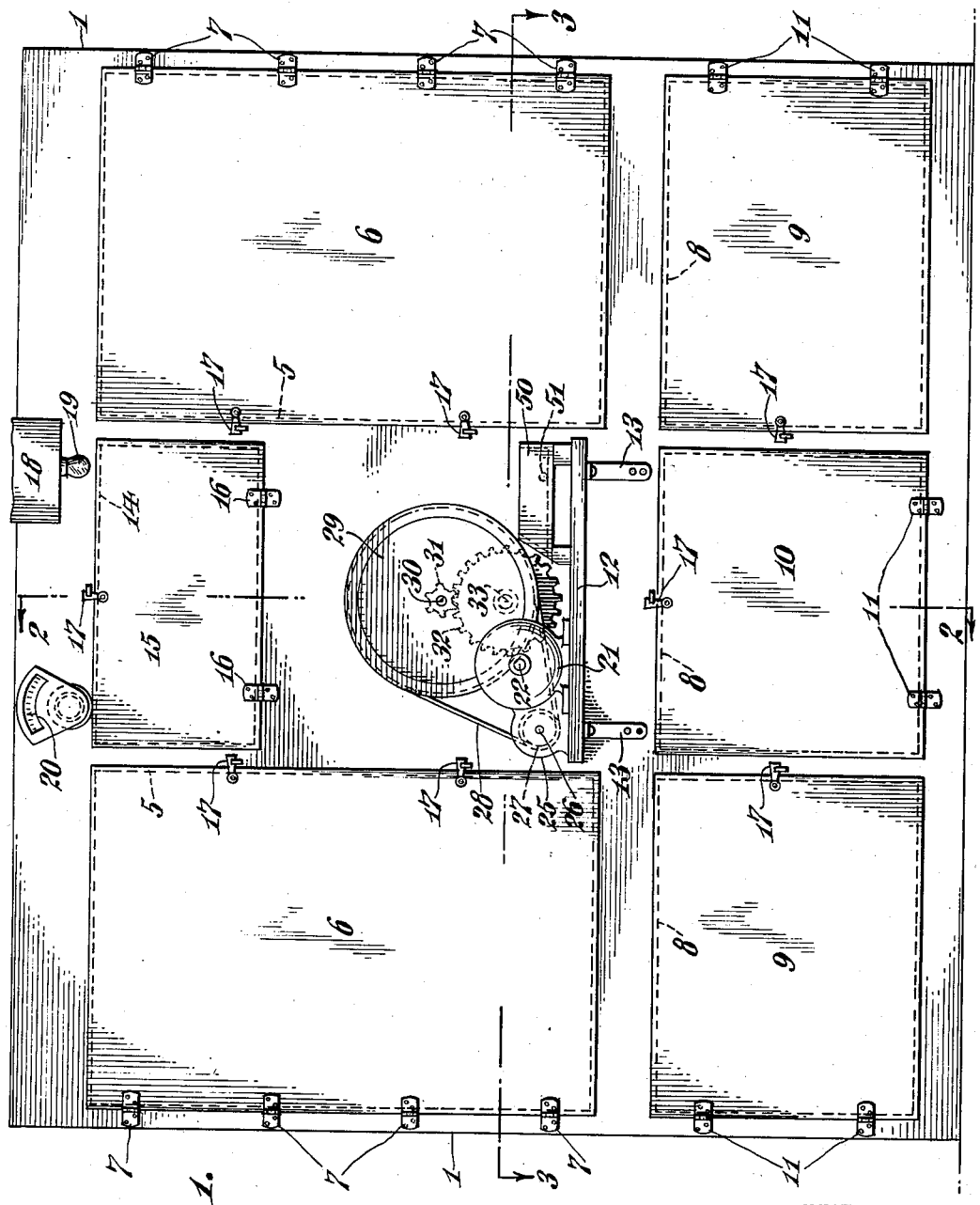
Figure 1 is a view in front elevation of an incubator constructed to carry out the improved steps of the method.

Referring to the drawings 1 identifies an incubator cabinet, it being obvious that this cabinet can be of any size of any configuration or shape, the walls thereof being of any suitable thickness, The cabinet is preferably constructed of wood, and each panel or side or face thereof comprises inner and outer thicknesses 2 and 3 including an intermediate thickness 4 of any suitable cold insulating material, preferably compo board.

The face of the cabinet as illustrated in Figure 1 has several ways of gaining access to the interior of the cabinet where the eggs are hatched. These different ways of entrance to the cabinet consist of openings 5 at the upper right and left portions of the face of the cabinet, and which are closed by doors 6 hinged at 7, and the openings 8 at the lower central and right and left hand ends of the face of the cabinet closed by doors 9 and 10 likewise hinged at 11. The upper part of the front face of the cabinet centrally thereof immediately above the door 10 constitutes a solid wall, on which a shelf 12 is supported by brackets 13.

The upper part of the central solid wall of the front face of the cabinet has an opening 14 closed by a door 15, hinged at 16.

The various doors 6, 9, 10 and 15 have suitable latches 17.

Also on the front face of the cabinet above the door 15 a relay-containing box 18, and an exposed red signal light 19 are arranged.

Likewise an indicator 20 is supported on the front face of the cabinet above the door 15.

A motor 21 is mounted upon the shelf 12, and its shaft 22 carries a gear 23, which in turn meshes with the gear 24. The gears 23 and 24 are mounted in the housing 25, and the shaft 26 of the gear 24 carries a pulley 27 with which a belt 28 engages and in turn passes about a large pulley 29 on one end of the stub shaft 30, which carries a pinion 31 meshing with a gear 32, which is rotatable with a shaft 33. This shaft 33 has its forward portion in bearings 34 and 35, the former being fastened to and carried by a metal bar 36 of an interior skeleton frame 37, which is mounted on the interior 38 of the cabinet, and which skeleton frame may be constructed of any suitable angle elements. The forward portion of the shaft 33 is also mounted in a bearing plate 34a. The other bearing 35 is carried by an interior water trough or container 39, which is suspended on the shaft 33 by means of the bearing 35 and a bearing 40 at the inner end of the trough. A drum 41 is mounted in the trough 39, which contains water, and fixed to the shaft 33 at 42 is a plurality of moisture gatherers 43, which are in the form of wire fabric segments as more clearly shown in Figure 5.

These wire fabric segments are in staggered relation on the shaft 33, so that the current of air derived from the rotation of the fan 44 at the rear of the inner drum 45, which is surrounded by an outer drum 46, will be broken up. The two drums 45 and 46 are spaced concentrically and rotatable with the shaft 33 through the medium of the spider 47 at the rear of the drums, and which spider supports both drums, there being a ring 48 which spaces the drums apart. Movable with the ring 48 and the drums is a circular plate 49, which revolves at the rear of the incubator cabinet. The rear end of the shaft 33 is mounted in a bearing 47a of a spider 47.

In order to supply water to the trough 39 a receptacle 50 is mounted on the shelf 12 carried by the front face of the cabinet, and connected to the container or receptacle 50 is a pipe 51, which has a lateral branch 52 extending in a direction toward the trough and terminates in a portion 53, which passes through an opening 54a of a plate 54 loosely mounted on a shaft 33 at the front end of the drum 46 and through the front end wall of the trough, thereby feeding water to the trough, and into which water the segments 43 dip. As previously stated the segments 43 are in staggered relation so that the current of air generated by the fan 44 will not have a direct passage through the drum 41, but will have an undulated course therethrough. The air will be thoroughly broken up and agitated during its passage through the drum 41. However a certain amount of the air generated by the fan 44 passes through the drum 45, then back through the drum 46 and thence through the various elongated slots 55 of the drum 46. The slots 55 are arranged at intervals throughout the cylindrical wall of the drum 46, therefore the air will discharge from polygonal points relative to the drum, and since the drum 46 revolves, the air will have a centrifugal action in circulating within the interior of the cabinet.

The shafts 56 are mounted in bearings 57 carried by angle plates 58 of the skeleton frame 37, and mounted upon the shafts 56 are discs 59, on which the outer surface of the drum 46 is rotatably supported so as to provide for an even rotation of the two drums.

The fan 44 at the rear of the drums 45 and 46 is carried by a shaft 60 of a motor 61, the rear part of which fits in a depression 62 of a panel or door 63. Supporting plates 64 are secured at 65 to the panel 63, the supporting plates 64 being adjacent opposite portions of the motor 61, there being brackets 66 carried by the motor and in turn fastened at 67 to the supporting bars 64. In this manner the motor is operatively supported in position. The panel 63 is supported in an opening 67a in the rear wall of the incubator cabinet by means of the latches 68. Obviously by disengaging the latches the panel or door 63 may be removed and with it the motor and the fan 44, enabling the access to the incubator cabinet from the rear. The usual cord 69 incasing the usual electric wires is operatively connected at 70 to the motor 61 and is provided with the usual socket receiving plug 71, which may be plugged in in any suitable electric outlet socket, whereby electrical current may be supplied to the motor.

Supported at 72 adjacent the edges of the opposite sides of the trough 39 (which is semicylindrical) are resistance heating elements 73, to which the usual lead wires 74 are connected, which are in circuit with the motors 21 and 61, as disclosed in the wiring diagram in Figure 13, and when the mechanism of the incubator is in operation electrical current is furnished to the heating elements, for generating heat centrally of the cabinet.

The current of air generated by the fan 44 and being forced through the drum 45 is heated by the resistance heating elements, and due to the moisture gatherers dipping into the trough 39, the moisture gathered thereon is vaporized and thereby mixes with the heated air and is circulated in the interior of the incubator cabinet through the medium of centrifugal action, that is to say, as it discharges through the slots 55 of the drum 46 as it rotates.

The circular plate 49 carries a lateral cylindrical flange 75, to a bent portion 76 of which pieces of circular wire fabric 77 and 78 are fastened, it being noted that the latter pieces are deflected at an angle from the former more clearly shown in Figures 2 and 8, and are adapted to dip into a water trough 79 at the bottom of the cabinet adjacent the rear wall. As the circular plate 49 rotates with the drums 45 and 46 the moisture carrying circular pieces 77 and 78 gather moisture from the water in the trough 79, and which is vaporized by the heated air on the interior of the cabinet.

Just above the trough 79 and approximately centrally thereof are resistance heating elements 80 and 81, which are also in circuit with the motors 21 and 61 and the source of current supply over the main lead wires 82 and 83, as shown in the electrical diagram of Figure 13. These resistance heating elements also act to heat the air as it circulates within the cabinet, and since they are located adjacent and a little above the trough 79, the moisture of the circular pieces 77 and 78 is vaporized and mixes with the air, and thereby provides uniformly moisture laden air, which is agitated and uniformly distributed to all parts of the interior of the cabinet.

The heating elements 80 and 81 are supported by the brackets 82 and 83, which are secured at 84 to the rear face of the cabinet, there being deflectors 85 and 86 carried by the brackets, acting to direct the moisture rising from the water in the trough 79 toward the wire fabric pieces 77 and 78. Since the heating elements 80 and 81 are just above the trough 79, the heat from the elements has a tendency to vaporize the water in the trough, the vapor in turn circulating and mixing with the air on the interior of the cabinet, thereby insuring maintaining the heated air laden with moisture.

As shown in Figure 4 an annular band 87 is supported by angle plates or brackets 88, and which band substantially encircles the outer edges of the wire fabric pieces 77 and 78 and thereby tend to deflect the moisture laden air toward the eggs supported in the skeleton frame 37.

The water container 89 is located at the rear of the cabinet, more clearly shown in Figure 8, and has a pipe 90, connecting it with the trough 79, keeping the trough 79 supplied with water, in which the wire fabric pieces 77 and 78 travel, as the drums 45 and 46 and the circular plate 49 rotate.

The main conductors 82 and 83 which feed the motors 21 and 61 in parallel, also feed the light 19, the heaters 73, 80 and 81, the heaters 80 and 81 being controlled respectively by the switches 91 and 92 and the motors 61 and 21 respectively by the switches 70 and 70a.

When contact is made between the contacts 102b and 102c some current passes through the resistor coil 102a, the indicator 20 and the relay 101, and even though the thermostat opens, current will still pass through 102 and 101, the heating element 81 carrying a portion of the load.

Adjacent the bottom of the cabinet in the opposite end walls thereof are slide controlled vents 94, while in the rear wall of the cabinet near the center thereof slide controlled air vents 95 are arranged for the intake of fresh air as the fan 44 rotates. The air vents 94 take in air near the bottom of the cabinet, while the vents 95 take in fresh air at the center of the cabinet.

The end walls of the cabinet adjacent the top have slide controlled vents 96, which are provided for permitting escape of air, the various slides of all the vents 94, 95 and 96 being adapted to be adjusted according to the desired temperature on the interior 38 of the cabinet.

Mounted on the interior 38 of the cabinet and held in a proper position by means of a support is conventional type of a thermostat 98, wherein the expansion and contraction of the helically coiled tube 99 will cause corresponding expansion and contraction of the rod 100, which is connected in a conventional manner to any well known temperature indicating and circuit control device 20, shown in the circuit diagram in Figure 13, as well as identified in Figures 1 and 2. By means of the thermostat 98 the control device 20 will indicate the temperature on the interior of the cabinet, as well as control the circuit, and by properly adjusting the various slide controlled intake air vents and discharge air vents, a uniform moisture ladened-temperature may be maintained on the interior of the cabinet, and due to the rotation of the drum for creating a centrifugal action on the interior of the cabinet a thorough and uniform distribution of moisture ladened air may be maintained throughout all portions of the interior of the cabinet. The specific wiring diagram in Figure 13 is merely a conventional arrangement, the same as it is in Figure 18 of the United States Letters Patent #2,026,530 issued in the name of Wilson T. Hager, January 7, 1936 and is not necessarily specifically a part of this invention of method.

Experiments have shown that such uniform distribution and uniform moisture laden air on the interior of the cabinet insures a quicker and substantially simultaneous hatch of the eggs. Through the medium of experimental tests it has been found preferable to rotate the drums 45 and 46 and the circular plate 49 approximately 3⅓ revolutions per minute, thereby creating in addition to uniform distribution of the moisture laden air, a gradual centrifugal action to the air from polygonal points. The electric circuit shown in Figure 11 includes a conventional relay 101 and a conventional type of transformer 102, which are housed in a box or container 18 on the front face of the cabinet as shown in Figure 1, the signal light 19 acting to indicate that the circuit is closed and that the incubator is in operation. When the plug 71 is inserted into a suitable receptacle, current flows over the conductor 82, through the motors, heating elements, if they be in circuit, and back to the source. The heating elements 73, light 19 and heating element 80 are connected across the conductors 82 and 83 in series with the contacts 102a of the relay 101, so that unless the relay is closed, the said heating elements and light 19 are inactive. The heating element 81 may be placed in circuit or cut out of circuit by proper adjustment of the switch 82 and the heating element 80 may be made to function with the heating elements 73 or not, according if the switch 91 is open or closed. The high and low contacts of the indicator 20 are connected respectively with the conductors 82 and 83 and the magnet of the relay 101 is connected across the high contact of the indicator and the center contact 100a. The secondary of the transformer 102 is connected across the magnet of the relay 101. If the relay be in open position and the thermostat moves to the low side so as to bridge the low contact and the contact 100a (Figure 13), current will flow from the conductor 83 to the low contract, thence through the magnet of the relay 101 and return to the source of the conductor 82. The magnet is thus energized and its armature will be elevated to bridge the contacts 102a, when current will flow over the conductor 83 to one of the contacts 102a, thence to the other, thence through the light 19, and resistances 73 (and resistance 80, if the switch 91 be closed), returning to the source of the conductor 82. But bridging the contacts 102a closes the circuit on the primary of the transformer 102, one of whose terminals is connected to one of the contacts 102a and the other of whose terminals is connected to the conductor 82. Thus the secondary of the transformer will be energized and will keep the magnet of the relay energized, so that the relay will be retained in closed circuit, irrespective of whether or not the thermostat is on closed circuit on the low side. When the temperature rises to the point where the thermostat is moved to the high side and bridges the high contact and center contact 100a, the magnet of the relay 101 is short-circuited, so that it is deprived of current that was previously supplied through the secondary of the transformer 102. The relay therefore will drop to open position and cut out the heating resistances, indicating the fact by extinguishing the light 19. On the dropping to the low temperature, the circuit is again closed by thermostat and the previously described cycle of operation is repeated. The heater 18 is designed to be selectively cut into and out of circuit by the operation of the switch 92.

Tubular rods 106 are supported on the horizontal longitudinal angle bars 105a, there being clamping plates 107 engaging over the ends of the tubular rods to hold them in position, the clamping plates 107 at the rear of the rods being carried by the vertical angle irons 105 at the rear of the frame, while the horizontal angle irons 105a are carried by the front intermediate vertical strips 105b.

At intervals rods 108 pass through the tubular rods 106, and through the horizontal longitudinal angle bars 105a and through the rear vertical angle irons 105 and provided with nuts 109, thereby tieing and reinforcing the structure of the skeleton frame. In this instance the tubular rods 106 act as spacers and insure rigidity for the frame. As shown in the drawings, the trays are provided with covers 124, which consist of end pieces 125 and the longitudinal metal strips 126, which are covered by wire fabric 127 as shown, so that by means of the wire fabric, the moisture laden air may easily percolate therethrough, and in contact with the eggs in the tray. The end strips 125 of the covers have flanges 128, which engage in between the sides of the tray, to prevent movement of the covers, which are provided for keeping the chickens, when hatched in the trays, until removed.

A skeleton frame 37 is arranged in the interior 38 of the incubator. This frame is made up of upright corner angle bars and intermediate vertical angle bars 104 and 105, and horizontal longitudinal angle bars 105a. This structure is designed to fit the interior of the hatching chamber 38 of a super incubator cabinet, in a position between the front and rear walls of the cabinet. It is obvious that this frame may be of any size according to the dimensions of the cabinet. The parts of the frame 37 are assembled in such wise as to support trays of eggs in super-imposed positions and in a number of tiers.

While the heated air is directed in an undulated course and then centrifugally distributed, it is obvious that when said heated air leaves the central drum 46 the travel or flow of said air, more or less, assumes an intermittent or periodical interruption, which is due to the narrowness, circumferentially, of the slots 55, in the wall of the central drum 46 and also due to the broadness, circumferentially, of the wall portions (between the slots 55) of the central drum 46. In other words, when said heated air leaves the central drum 46, it slows up perceptibly periodically in its travel or flow, to all portions of the hatching chamber, but even though this periodical slowing up occurs at 46a, said heated air will reach all portions and corners of said hatching chamber, thereby insuring thorough hatching of all the eggs supported in said chamber. By slowing up the heated air in this manner, said heated air does not flow too forcibly to all portions and corners of said chamber, as to cause a back flash of said heated air, thereby causing a thorough uniform temperature.

The invention having been set forth, what is claimed is:

1. In a method for hatching eggs, the steps consisting in introducing fresh air into the hatching chamber of an incubator, generating heat and mixing it with said air, impelling said heated air in an undulated course, producing water vapor, and moistening said heated air with it, centrifugally distributing said heated and moistened air in said chamber, introducing additional fresh air in said chamber, generating water-vapor and introducing additional moisture into said chamber, mixing said additional fresh air and water-vapor with the first water-vapor laden air, and thermostatically so controlling the temperature and the heating of the air that the temperature and moisture of the air, before it strikes the eggs, will be constant and uniform.

2. In a method for hatching eggs, the steps consisting in introducing fresh air into the hatching chamber of an incubator, generating heat and mixing it with said air, impelling said heated air in an undulated course, producing water vapor, and moistening said heated air with it, centrifugally distributing said heated and moistened air in said chamber, introducing additional fresh air in said chamber, generating water-vapor and introducing additional moisture into said chamber, mixing said additional fresh air and water-vapor with the first water-vapor laden air and automatically controlling the temperature and the heating of the air, so that the temperature and moisture of the air, before it strikes the eggs, will be constant and uniform.

WILSON T. HAGER.